UNITED STATES PATENT OFFICE.

GEORGE WEINTRAUB, OF LYNN, MASSACHUSETTS, ASSIGNOR TO GENERAL ELECTRIC COMPANY, A CORPORATION OF NEW YORK.

PROCESS OF OBTAINING TITANIC OXID.

1,014,793. Specification of Letters Patent. Patented Jan. 16, 1912.

No Drawing. Application filed December 2, 1909. Serial No. 530,939.

*To all whom it may concern:*

Be it known that I, GEORGE WEINTRAUB, a subject of the Czar of Russia, residing at Lynn, in the county of Essex, State of Massachusetts, have invented certain new and useful Improvements in Processes of Obtaining Titanic Oxid, of which the following is a specification.

It is the object of my present invention to produce titanium oxid of a quality suitable for use in arc lamp electrodes and the like, by decomposition of ilmenite, or any titanium ore containing iron. As a by-product of the process, ferrous sulfate of a high degree of purity is obtained.

Ilmenite is a mineral obtainable from ilmenite ore by magnetic separation or other concentrating method. Ilmenite consists largely of iron titanate, $FeO,TiO_2$. Its theoretical composition is 52.63% $TiO_2$ and 47.37% FeO, though in commercial practice the proportion of $TiO_2$ may vary. The ore may also contain some silica and other impurities.

The method generally used heretofore for the decomposition of titanium ores containing iron, consisted in fusing the ore either with sodium carbonate, or with sodium bisulfate, and subsequent chemical treatment of the fusion. These methods are altogether too expensive and too complicated for the production of titanium oxid on a commercial scale.

I have discovered that concentrated sulfuric acid accomplishes this decomposition in a simple and quantitative way, that the outside temperature to be applied need not exceed the temperatures easily reached by steam and finally that no excess, above the theoretical amount, of sulfuric acid is necessary to cause quantitative decomposition. By combining these discoveries I have developed a cheap and commercial method for the preparation of titanium oxid from the ore.

According to my invention, ilmenite is decomposed by sulfuric acid to form a mixture composed largely of ferrous sulfate and titanium sulfate. After cooling, these sulfates are dissolved in or treated with water from which meta-titanic acid can subsequently be precipitated, and, after washing and drying, can be calcined, to yield titanium dioxid sufficiently free from iron and otherwise suitable for use as material for the manufacture of arc lamp electrodes, either as such or after transformation into titanium carbid.

The ilmenite, ground to the fineness of flour, is first subjected to the decomposing action of hot concentrated sulfuric acid. The sulfuric acid need not be pure, and cheap acid, of specific gravity 1.84 and 66° Bé. (93%), is altogether suitable. The quantity of acid may vary through reasonable limits, but the theoretical amount required, namely, double the weight of the ilmenite under treatment, is sufficient.

A cast iron container can be used for holding the reaction mixture, and can be heated by steam or otherwise. The reaction starts at about 100° C., but as the reaction is exothermic, the temperature of the mixture goes up of itself to a much higher temperature. The mixture is stirred until it becomes solid. This insures complete decomposition of the ilmenite and has the special function of preventing the mixture from hardening in the iron container.

According to my present opinion, the chemical reactions taking place are as follows; first, ferrous sulfate and titanium sulfate are formed according to the reaction:

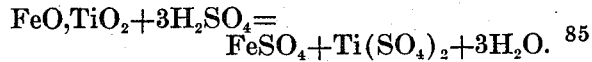
$$FeO,TiO_2 + 3H_2SO_4 = FeSO_4 + Ti(SO_4)_2 + 3H_2O.$$

The sulfates interact with reduction of the titanium sulfate to the blue sesquisulfate, while a corresponding amount of ferrous sulfate is oxidized to ferric sulfate according to the reaction:

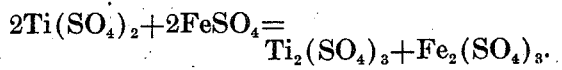
$$2Ti(SO_4)_2 + 2FeSO_4 = Ti_2(SO_4)_3 + Fe_2(SO_4)_3.$$

The reaction product is a bluish powder showing yellowish streaks of the ferrous and ferric sulfate.

If it is desired to obtain a very pure product the reaction mass is allowed to cool and then is treated with a large amount of cold water. Constant agitation accelerates solution; any residue settles readily, allowing the clear solution to be siphoned off. The reaction mass dissolves under these conditions almost completely and the meta-titanic acid can be precipitated now from the slightly acid solution by diluting and boiling. Owing, however, to the presence of ferric sulfate in the solution, precipitation by boiling is liable to throw down a considerable amount of basic ferric sulfate along with the titanium compound. It is therefore necessary to reduce the ferric salt in the cold solution. This is performed by adding zinc or sulfurous acid or a concentrated sodium thiosulfate solution until no more reaction with potassium sulfocyanate takes place, which indicates that the ferric salt has been reduced to the ferrous state. After reduction of the ferric sulfate as described above, the solution is heated to the boiling point, at which temperature the titanium sulfate is in a very short time completely converted into meta-titanic acid, which precipitates from the solution, leaving the iron in solution as ferrous sulfate. The heating can best be effected by introducing steam into the solution. The relatively insoluble meta-titanic acid settles readily, and can easily be filtered off, washed with hot water, dried and calcined to a very light titanium di-oxid, with not more than 1% to 2% iron oxid. The filtrate, when concentrated crystallizes out a very pure ferrous sulfate, which constitutes a valuable by-product.

If a less pure product is satisfactory, the operation can be simplified considerably, owing to the fact that the titanium sulfates, the blue sesquisulfate in particular, are decomposed by a relatively small amount of boiling water under formation of meta-titanic acid. In this case the treatment of the reaction product is as follows: The reaction product is treated with enough cold water to dissolve the iron salts and to form a suspension of the product in water. For each 100 g. of ilmenite originally taken, 500 cc. of water are sufficient. This mixture is stirred for a long time in order to insure complete solution of the iron salts and disintegration of the titanium sesquisulfate particles. The reduction of the ferric sulfate is performed during this part of the operation, in the manner already described. After the reduction, the mixture, consisting of a solution of titanium sulfate and ferrous sulfate and of a suspension of titanium sulfates, is thrown into a large quantity of boiling water, whereby meta-titanic acid is formed, which is filtered and treated in the same manner as described above.

What I claim as new and desire to secure by Letters Patent of the United States is:

1. The method which consists in decomposing ilmenite with about double its own weight of hot concentrated sulfuric acid, treating the reaction product with water, and precipitating a relatively pure titanium compound by boiling.

2. The method which consists in decomposing ilmenite with sulfuric acid in the proportions and at a temperature sufficient to produce a substantially dry mass containing titanium sesquisulfate, and subsequently converting said titanium sesquisulfate into titanium oxid.

3. The process which consists in decomposing ilmenite with sulfuric acid, treating the reaction product with sufficient water to dissolve the iron sulfates while maintaining the titanium sulfate in suspension and adding a large amount of boiling water, thereby forming a relatively insoluble titanium compound while maintaining the iron sulfates in solution.

4. The step which consists in treating ilmenite with about double its weight of hot concentrated sulfuric acid to produce a nearly dry mass of ferrous sulfate, ferric sulfate, and titanium sesquisulfate.

5. The method which consists in treating ilmenite with hot concentrated sulfuric acid in the proportions and at a temperature sufficient to produce a substantially dry mass containing sulfates, treating said product with water, treating with a reducing agent to reduce any ferric sulfate present, and then heating to the boiling point to form meta-titanic acid.

6. The method which consists in acting upon ilmenite by concentrated sulfuric acid in the proportions and at a temperature sufficient to produce a substantially dry mass, treating the reaction product with water, reducing any ferric sulfate present to ferrous sulfate, forming meta-titanic acid by heat treatment, and then calcining to produce titanium dioxid.

7. The method which consists in decomposing ilmenite with sulfuric acid in the proportions and at a temperature sufficient to produce a substantially dry mass of sulfates, dissolving the iron sulfates in water and decomposing a titanium compound so formed, while holding the iron compound or compounds in solution.

8. The method of making titanium dioxid and ferrous sulfate from ilmenite which consists in decomposing the ilmenite with hot sulfuric acid to form a mixture of ferrous sulfate, ferric sulfate and titanium sesquisulfate, treating the reaction product with sufficient water to dissolve at least the iron-sulfates, reducing any ferric sulfate present, heating to precipitate meta-titanic acid filtering the latter, and crystallizing ferrous sulfate from the filtrate.

In witness whereof, I have hereunto set my hand this 29th day of November, 1909.

GEORGE WEINTRAUB.

Witnesses:
JOHN A. MCMANUS, Jr.,
CHARLES A. BARNARD.